Feb. 16, 1971    J. A. WHITING ET AL    3,563,758
ANIMAL FEED OF RUMEN CONTENTS WITH MALT DIASTASE, WOOD
CHARCOAL, AND PROTOPEPTONE
Filed Feb. 12, 1968
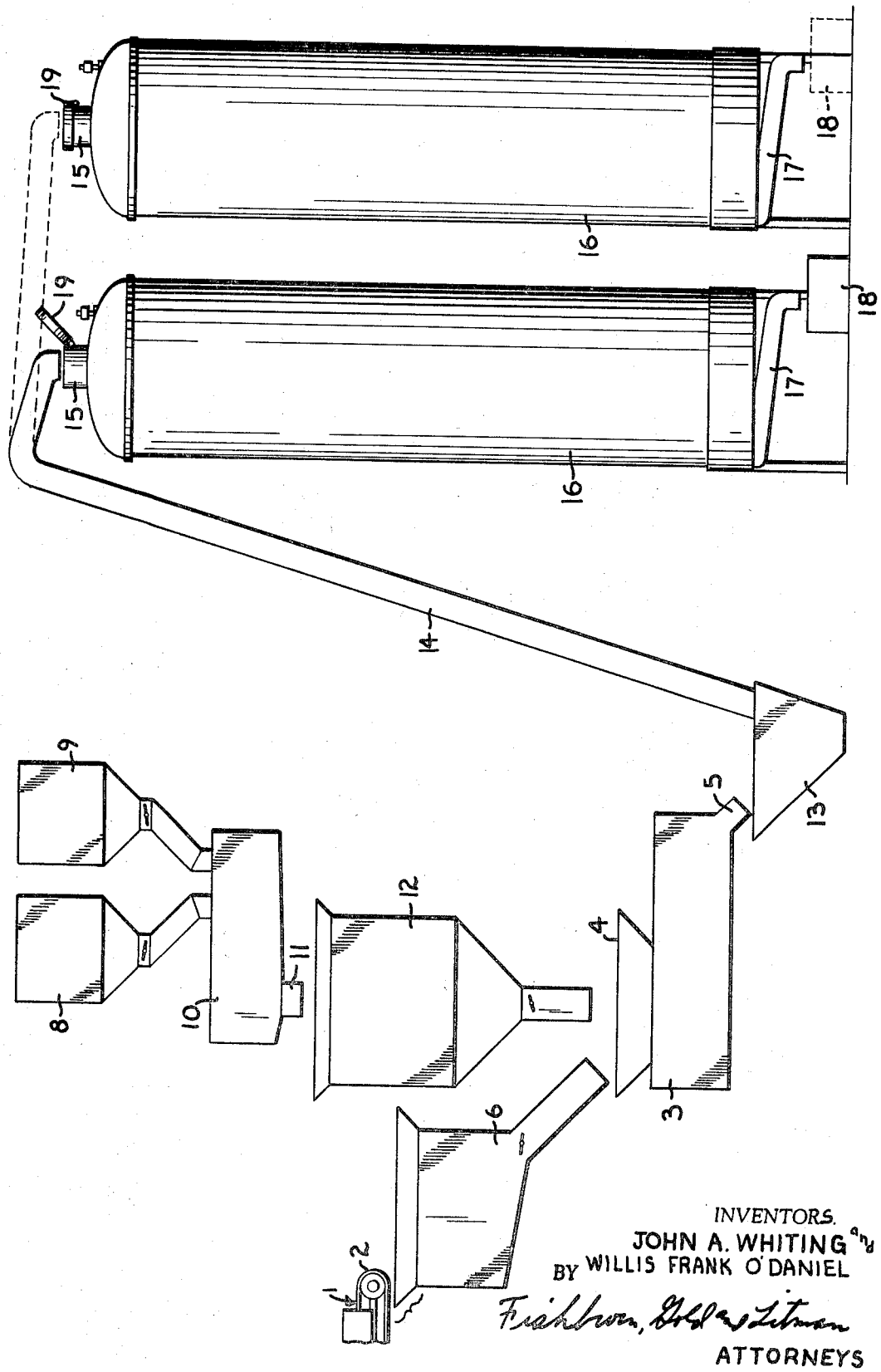
INVENTORS.
JOHN A. WHITING and
BY WILLIS FRANK O'DANIEL
ATTORNEYS

United States Patent Office 3,563,758
Patented Feb. 16, 1971

3,563,758
ANIMAL FEED OF RUMEN CONTENTS WITH MALT DIASTASE, WOOD CHARCOAL, AND PROTOPEPTONE
John A. Whiting and Willis Frank O'Daniel, Kansas City, Mo., assignors to Con-Ferm, Inc., Kansas City, Mo., a corporation of Missouri
Filed Feb. 12, 1968, Ser. No. 704,937
Int. Cl. A23k 1/10; A23j 1/02
U.S. Cl. 99—7          13 Claims

ABSTRACT OF THE DISCLOSURE

A feed for poultry and swine consisting of pathogen free rumen paunch contents and a control composition of a dry culture of rumen flora, sodium sulfate, malt diastase, protopeptone and a filler of charcoal and feed grain metal, the feed being processed by uniformly incorporating in the paunch contents the control composition and feed grains if desired and treating said mixture by residence in a large volume tank under pressure and atmosphere control for conversion into a high nutrient feed.

---

This invention relates to improvements in feeds for poultry and animals, and refers more particularly to supplement constituents in rations for cattle, calves, sheep, poultry and the like.

It is well known that certain microorganisms are necessary in ruminant feeding for the conversion of non-protein nitrogen compounds of food into organismal protein which can be digested and absorbed by the host ruminant. Large quantities of the food intake of ruminants is retained in the rumen or paunch. In the slaughter of such animals the paunch contents have heretofor been part of the waste materials that present difficult problems in suitable disposal. Many packing houses endeavor to dump such materials into sewers which go to streams and cause pollution, which has resulted in legislation and regulations to prevent such disposal. The waste disposal of packing plants is presenting problems of such magnitude that continuing operation at present locations are doubtful, and the paunch material or contents of the animals slaughtered is a very substantial portion of the quantity of waste now being handled at such plants. There have been attempts to remove and use paunch contents of slaughtered ruminants as swine feed, however, due to undesirable ordors and repulsion by the animals, such efforts have been failures.

The present invention contemplates use of rumen paunch contents from animals that are approved for slaughtering and converting same into usable feed, thereby reducing the waste disposal problems of the packing plants and providing a high value growth producing feed component for cattle, calves, sheep, swine, poultry, and the like.

The principal objects of the present invention are to provide a feed producing process wherein paunch contents of approved slaughtered ruminants are mixed with a treating composition, and then maintained in an atmosphere for controlled fermentation, to produce a high value growth producing feed with desirable odors and that can be stored or packaged for later feeding; to provide a process in which the paunch contents has feed grains mixed therewith and said mixture treated; to provide such a process in which the feed is inhibited against mold and rotting; and to provide a feed produced by such process that can be easily handled by mechanized equipment, economically produced, has no undesirable odors, and provides a high value growth to the animal or fowl consuming same.

Other objects and advantages of this invention will become apparent from the following description, taken in connection with the accompanying drawing, wherein are set forth by way of illustration and example certain embodiments of this invention.

The figure is a schematic view of the feed processing system.

The feed product of the present invention has as its principal ingredients pathogen free rumen paunch contents obtained from ruminants as they are slaughtered under U.S. Government inspection, or combinations of such paunch contents with added corn, milo, soy bean meal, cottonseed meal, and like grains and material used as feed, referred to herein as feed grains, such rumen contents and/or contents and added feed grains and the like being processed as later described, to provide the desired feed characteristics.

The feed materials, namely rumen paunch contents to be treated or processed are of high moisture content, as for example, 60 to 80% moisture. Mixtures of such paunch contents and feed grain may have a moisture content of from 40% to 70%. The paunch contents and moisture thereof being treated is retained in a treating tank or storage vessel of large capacity and controlled atmosphere where it is believed the microorganisms or flora of the rumen freely convert or act on the material to produce the desired feed. The time of storage or treatment preferably is in the nature of five to ten days at ordinary temperatures, however, this may vary if the surrounding temperatures were controlled.

It has been found that to control the activity and facilitate the conversion, a control composition or additive is mixed with the feed ingredient being treated. While the materials of the control composition could be added separately to the paunch contents and feed grains or the like, it is preferred that the composition be premixed and then that composition proportioned to the feed mixture.

In order to be assured that desired microorganisms be present in the treatment, a quantity of a composition comprising a dry culture of rumen flora of a ruminant animal, a microorganismal growth stimulating substance of the class consisting of essential amino acids, B-complex vitamins, proteins, bioses, and essential minerals and a carbohydrate is placed in the control composition, such a dry culture being prepared as disclosed in the Turner Pat. No. 2,560,830, issued July 17, 1951. The control composition also preferably includes sodium sulfate, yeast, protopeptone, malt diastate, wood charcoal, and a small quantity of meal, such as corn meals, soy bean oil meal, and the like as a filler. Also, a suitable fungicide may be added, as for example, sorbic acid, potassium sorbate and the like. It has been found that a suitable mixture of the ingredients of the control composition may be added in the proportions of 1½ to 4 pounds to a ton with a preference of about 3 lbs. to a ton of feed material, and an example of such a control composition is as follows:

Dry culture of rumen flora composition—1 oz.
Yeast—½ lb.
Sodium sulfate—1 lb.
Prtopeptone—6 drops
Malt diastase—2 oz.
Charcoal—1 oz.

and feed grain meal such as corn meal, soy bean meal, and the like, approximately 5 oz., or an amount sufficient to make the total weight of said control composition formulation 3 pounds. This is a preferred mix of the control composition. The aforesaid mixture may be varied, as, for example, dry culture of rumen flora 2 to 4 parts, yeast 5 to 15 parts, sodium sulfate 10 to 30 parts, protopeptone 2 to 10 drops, malt diastose 5 to 15 parts, sorbic acid up to 1 part, charcoal and meal making up the remainder of 100 parts by weight, with the charcoal preferably being approximately twice the weight of the meal.

In the processing of the feed material or mixture, the paunch contents of approved ruminants are removed as the ruminants are slaughtered, said contents being placed on a suitable conveyor 1, which may be in the form of ducts, chutes, belts or other mechanical conveyors, to convey said contents to a point 2 for discharge into a suitable mixer 3. The mixer preferably is a continuous type wherein the ingredients to be mixed are delivered continuously as at 4 and suitably mixed and discharged from an outlet 5. However, the mixing may be done by batch mixers, and in such cases it is preferred that the conveyor 1 discharge into a receiver 6 for accumulation and subsequent discharge to the mixer 3. The receiver 6 is also used to receive paunch contents when the production or slaughter schedule is faster than provided for in mixer capacity. In such cases excess is deposited in the receiver 6 for later delivery to the mixer 3. The ingredients of the control composition may be mixed and packaged for suitable introduction in proper proportions, namely, 3 lbs. to the ton of rumen paunch material or other feed material before mixing therewith in the mixer 3. If rumen paunch contents are being processed in the mixer 3 the control composition is introduced at a proper rate to the mixer for uniform distribution and mixture with said paunch contents.

Where corn, feed grains, or meal is to be mixed into the paunch contents for the combined feed mixture, it is preferred that the control composition be mixed with the added feed grains or the like, as, for example, the control composition can be placed in a hopper 8 and the feed grains in a hopper 9 for proper discharge in suitable proportions to a mixer, preferably a batch type 10, where the feed grains and control composition are thoroughly mixed and then discharged through an outlet 11 into a hopper 12. If the feed product is to have a mixture of the paunch contents and feed grains, then the feed grains and the control composition are discharged from the hopper 12 to the inlet 4 of the mixer 3 in the proper proportions, as, for example, if the feed product is to contain 2 parts paunch contents and 1 part feed grains, there would then be introduced into the mixer 10, 9 lbs. of the control mixture per ton of feed grains, and this mixture would be such that as 2 tons of paunch contents is delivered into the mixer 3, approximately 1 ton of feed grains and control composition would be introduced from the hopper 12 into the mixer 3. After the thorough mixing in the mixer 3, the mixed feed material is discharged from the outlet 5 of said mixer 3.

Regardless of the feed mixture the mixed material from the mixer 3 is discharged into a receiver 13 of a conveyor 14 which elevates or otherwise delivers the mixture through an inlet 15 of a treating and storage tank 16. The vessels or tanks 16 are of large capacity for containing the feed material for a desired treatment period. It is preferred that there be two or more of the treating tanks, so that when one is used merely for storage, or is shut down for some reason, such as cleaning or the like, another will be operable. It is preferred that the treating tanks or chambers be such that they are top filling and bottom unloading, and after being filled, the same volume of material added each day at the top can be removed from the bottom as finished or processed feed for delivery through a discharge 17 to a suitable receiver, bagger, or conveyance 18, for proper handling or packaging of the feed product.

The tank 16 is preferably of a type that is substantially air tight, and may be formed of suitable metal with a lining approved for contact with feed, as, for example, with porcelain or suitable plastic such as vinyl or the like. The inlet 15 is provided with a cover 19, so when no material is being introduced therein, the cover is closed and sealed. It is preferred that the tanks be of large capacity, as, for example, 10,000 to 50,000 cubic feet, and it is preferred that the capacity of the tanks be such that they will contain 10 days' production of the feed materials. It is also preferred that each of the treating tanks 16 have unloaders of a suitable type that will remove the material from the bottom of the tank and deliver same through the outlet. Suitable unloader structure is shown in U.S. Pats. Nos. Re. 25,863 and 3,282,446. Each of the tanks have a pressure relief or breather valve in the upper portion thereof, and it is preferred that it relieve the pressure whereby the pressure inside of the tank will be between ¾ oz. per square inch of vacuum to 3 lbs. per square inch pressure.

When the feed material, with the control composition thoroughly mixed therein, is delivered to the treatment tank, the tanks are then closed except during filling operations, and through the action of microorganisms or rumen flora, oxygen in the tank is converted to carbon dioxide, so that the atmosphere becomes substantially inert. It is found that it is preferred to have a substantially continuous process in each tank, whereby each day, a day's production of feed is removed from the bottom of the tank, leaving a space in the upper part of the tank which is then filled with another day's feed mixture. The tank being opened during the delivery of the new material, allows some oxygen to enter the tank, and it is found that this oxygen is sufficient for continuation of the conversion of the feed material in the tank. With this arrangement, and a ten day cycle, the material removed from the bottom of the tank has been in residence therein for the ten day period, and said finished feed material may be bagged or otherwise stored without losing its high nutrient value, and it has agreeable odors, and can be used in any location where it would be proper to have swine and feed same.

It is preferred that the feed material being introduced into the feding tanks have high moisture content, as, for example, 60% to 80%. When dry feed grains are introduced into the mixer 3, they absorb some of the moisture from the paunch contents, thereby reducing the total moisture content thereof, and it is preferred that even with such mixture the moisture content be maintained at 40% or more. It is found that during the treatment there is some creation of heat, which tends to maintain a desired temperature inside of the treating tank, however, examination of the feed material discloses no excessive heat, nor is there any mold formation. While sodium sulfate or Glauber's salt is desirable because of economy and availability, magnesium sulfate or potassium sulfate may be substituted therefor, and where reference is made herein to sodium sulfate it is understood that this may be one of the group consisting of sodium bisulfite, sodium metabisulfite, sodium sulfate and potassium sulfate.

When paunch material from ruminants is exposed, it has odors, and in a very short time, as, for example, 6 to 8 hours, there appears to be a natural degradation or spoilage from the growth of contaminant microorganisms. From the action, there appears to be increased heat in the mass, very disagreable odors, to the point that they cannot be used in areas near human habitation. It also appears to have odors or characteristics that cause animals to avoid it, and while attempts have been made to feed swine with such paunch material or contents, a continued ration thereof is rejected by the swine, to the point that some will not eat such material after the second day. With the feed materials processed with this invention, the resulting feed may be fed as a continuing ration from day to day to swine, and the swine indicate a desirability therefor over other available feeds to the extent it would appear the swine would utilize such feed as its entire ration. However, it is preferred that the feed be used as a supplement, as, for example, with a feed prepared from the ruminant paunch content the daily ration for swine would be up to 5 lbs. per day per hog.

For feeds of mixtures of ruminant paunch contents and feed grains the ration is recommended of up to 10 lbs. per hog per day.

It will be understood by those skilled in the art that the ratios of mixture of feed grains with the ruminant paunch contents may vary, and also that the amount of control composition added thereto may also be used in amounts that may vary depending upon the particular feed mixtures. It is also to be understood that the terms "feed grains" is intended to include any such materials as corn, milo, soy bean and like feeds utilized for feeding cattle and swine and available or produced in the area surrounding the feed preparation location. It will also be understood that the time for the cycling or residence period of the feed materials in the treating tank may vary as from 5 to 10 days, and 7 days is a desirable period, as it easily fits into a weekly schedule of slaughtering operations and thereby processing of the ruminant paunch contents. It is apparent by the present method feed materials are produced that may be easily handled, stored, transported, and fed to animals with an absence of disagreeable odors or spoilage.

It is to be understood that while we have illustrated and described certain forms of our invention, it is not to be limited to the specific form, arrangement of parts, or method steps herein described and shown, except insofar as such limitations are included in the claims.

What we claim and desire to secure by Letters Patent is:

1. The process of preparing feed for cattle, calves, sheep, poultry, and swine comprising,
   (a) collecting pathogen free ruminant paunch contents,
   (b) uniformly incorporating in said ruminant paunch contents a control composition including protopeptone, malt diastase, wood charcoal and one of the group consisting of sodium bisulfite, sodium metabisulfite, sodium sulfate, magnesium sulfate, and potassium sulfate, said control composistion being present in the amount of 1½ to 4 lbs. per ton of said ruminant paunch content,
   (c) confining said ruminant paunch contents and control mixture in a confined zone of controlled pressures, said zone being of a relative size that during processing the atmosphere therein becomes substantially inert, and
   (d) maintaining said confinement for a period of at least five to ten days to complete the preparation.

2. The process as set forth in claim 1 wherein the pressure in the confined zone is maintained between about ¾ oz. per square inch vacuum and 3 pounds per square inch pressure.

3. The process as set forth in claim 1, wherein the major ingredients in the feed mixture consist of ruminant paunch contents to which is incorporated feed grains, whereby said feed grains will constitute up to 50% by weight of the feed product.

4. The process as set forth in claim 1, wherein the control composition includes a dry culture of rumen flora and a microorganismal growth stimulating substance of the class of essential amino acids, B-complex vitamins, proteins, bioses, and essential minerals and a carbohydrate.

5. The process as set forth in claim 2, wherein the control composition consists of dry culture of rumen flora composition, yeast, sodium sulfate, protopeptone, malt diastase, charcoal, and feed grain meal such as corn meal, soy bean meal, and the like.

6. The process as set forth in claim 3 wherein the control composition consists of sodium sulfate, 1 lb.; yeast, ½ lb.; a dry culture of rumen flora and a microorganismal growth stimulating substance, of the class consisting of essential amino acids, B-complex vitamins, proteins, bioses, and essential minerals and a carbohydrate, 1 oz.; protopeptone, 6 drops; malt diastase, 2 oz.; wood charcoal, 1 lb.; and feed grains meal to make a total of 3 pounds of control composition for a ton of the feed material.

7. The process as set forth in claim 3, wherein the control compound is mixed and dispersed with the feed grains prior to incorporating same into the ruminant paunch contents, whereby the ingredients are all uniformly incorporated and distributed through the feed mixture.

8. The process as set forth in claim 2, wherein the control composition consists of a dry culture of rumen flora and a microorganismal growth stimulating substance of the class consisting of essential amino acids, B-complex vitamins, proteins, bioses, and essential minerals and a carbohydrate, 2 to 4 parts; sodium sulfate, 10 to 30 parts; yeast, 5 to 15 parts; protopeptone, 2 to 10 dorps; malt diastase, 5 to 15 parts; wood charcoal, 10 to 30 parts; and feed grain meal, 5 to 15 parts; and sorbic acid up to 1 part, all parts being by weight.

9. A feed supplement for cattle, calves, sheep and swine comprising ruminant paunch contents in combination with yeast; protopeptone; malt diastase; wood charcoal; and one of the group consisting of sodium bisulfite, sodium metabisulfite, sodium sulfate, magnesium sulfate and potassium sulfate; the major portion of the feed supplement being ruminant paunch contents.

10. A feed supplement as set forth in claim 9 including feed grains with the ruminant paunch contents constituting more than 50% of the mixture with a moisture content of 40% to 180%.

11. A feed supplement as set forth in claim 9 and including a dry culture of the rumen flora of a ruminant animal, a microorganismal growth stimulating substance of the class consisting of essential amino acids. B-complex vitamins, proteins, bioses, essential minerals and a carbohydrate.

12. A feed supplement as set forth in claim 11 in which the ingredients in combination with the rumen paunch contents and feed grains consist of substantially 1 oz. of dry culture of rumen flora composition; ½ lb. of yeast; 1 lb. of sodium sulfate; 6 drops of protopeptone; 2 oz. of malt diastase; 1 lb. of charcoal, and feed grain meal such as corn meal, soy bean meal, and the like, in an amount sufficient to make the total of the composition 3 lbs.; said composition being from .1% to .13% by weight of the feed supplement.

13. A feed supplement as set forth in claim 10 in which the ingredients in combination with the rumen paunch contents and feed grains consist of substantially 2 to 4 parts of dry culture of rumen flora composition; 5 to 15 parts of yeast; 10 to 30 parts of sodium sulfate; 2 to 10 drops of protopeptone; 5 to 15 parts of malt diastase; 10 to 30 parts of charcoal; sorbic acid up to 1 part; and 5 to 15 parts feed grain meal such as corn meal, soy bean meal, and the like, all parts being by weight and said composition being from .1% to .3% by weight of the feed supplement.

References Cited

UNITED STATES PATENTS 2,560,830  7/1951  Turner _____ 99—9

FOREIGN PATENTS 998,589  7/1965  Great Britain _____ 99—2

OTHER REFERENCES

"Dried Rumen Contents In Calf Milk Replacements," North Dakota Agricultural Experiment Station Bimonthly Bulletin, vol. XVII, No. 3, Jan.–Feb., 1955 pp. 91–94, J. B. Williams and C. Jensen.

NORMAN YUDKOFF, Primary Examiner

C. P. RIBANDO, Assistant Examiner

U.C. Cl. X.R.

99—2, 9, 18